United States Patent
Hall et al.

(10) Patent No.: US 10,934,435 B2
(45) Date of Patent: Mar. 2, 2021

(54) DISPERSE AZO DYES, A PROCESS FOR THE PREPARATION THEREOF AND THE USE THEREOF

(71) Applicant: Huntsman International LLC, The Woodlands, TX (US)

(72) Inventors: Veronique Hall, Dornarch (CH); Siro Dalle Nogare, Basel (CH); Sandra Da Silva Saraiva, Gontenschwil (CH); Georg Roentgen, Freiburg (DE); Athanassios Tzikas, Dornach (CH)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 16/197,603

(22) PCT Filed: Dec. 15, 2016

(86) PCT No.: PCT/EP2016/081232
§ 371 (c)(1),
(2) Date: Nov. 21, 2018

(87) PCT Pub. No.: WO2017/202480
PCT Pub. Date: Nov. 30, 2017

(65) Prior Publication Data
US 2019/0153230 A1    May 23, 2019

(30) Foreign Application Priority Data

May 25, 2016 (EP) ..................... 16171373

(51) Int. Cl.
| | | |
|---|---|---|
| C09B 29/36 | (2006.01) | |
| D06P 3/54 | (2006.01) | |
| D06P 1/18 | (2006.01) | |
| C09B 29/42 | (2006.01) | |

(52) U.S. Cl.
CPC ............ *C09B 29/3639* (2013.01); *D06P 1/18* (2013.01); *D06P 3/54* (2013.01)

(58) Field of Classification Search
CPC ........... C09B 29/3639; D06P 3/54; D06P 1/18
See application file for complete search history.

(56) References Cited

U.S. PATENT DOCUMENTS

| | | |
|---|---|---|
| 3,853,895 A | 12/1974 | Lamm et al. |
| 3,878,189 A | 4/1975 | Guillet et al. |
| 3,980,634 A | 9/1976 | Weaver |
| 4,012,372 A | 3/1977 | Weaver et al. |
| 6,555,664 B1 | 4/2003 | Lauk et al. |
| 2006/0010619 A1 | 1/2006 | Hees et al. |
| 2016/0025151 A1 | 1/2016 | Oh |

FOREIGN PATENT DOCUMENTS

| | | | |
|---|---|---|---|
| CN | 102652155 A | 8/2012 | |
| GB | 1561772 A | 3/1980 | |
| WO | 2002068539 A1 | 9/2002 | |
| WO | 2004056926 A1 | 7/2004 | |
| WO | 2005024123 A2 | 3/2005 | |
| WO | WO2005/024123 * | 3/2005 | ............... D06P 3/60 |
| WO | 2007082803 A1 | 7/2007 | |
| WO | 2010046192 A2 | 4/2010 | |
| WO | 2011072966 A1 | 6/2011 | |
| WO | 2014016072 A1 | 1/2014 | |

OTHER PUBLICATIONS

PCT International Search Report for patent application PCT/EP2016/081232, dated Feb. 15, 2017, 9 pages.

* cited by examiner

*Primary Examiner* — Amina S Khan
(74) *Attorney, Agent, or Firm* — Huntsman International LLC; Robert Diaz

(57) ABSTRACT

The present invention relates to azo dyes of formula (1)

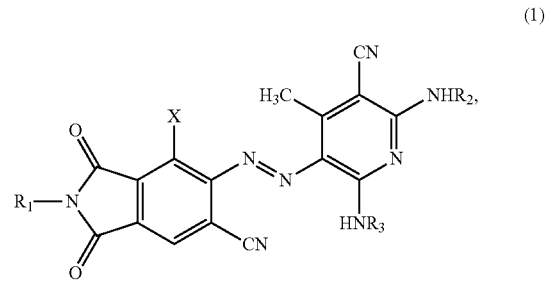

wherein
$R_1$ denotes hydrogen or $C_1$-$C_{12}$alkyl which is unsubstituted or substituted by one or more $C_1$-$C_{12}$alkoxy groups, $C_1$-$C_{12}$alkylcarbonyl groups, $C_7$-$C_{25}$arylcarbonyl groups, hydroxyl groups, amino groups, cyano groups or halogen atoms and which may be interrupted one or more times by the radical —O—, —S—, —$NR_4$—, —COO— or —OOC—, $R_4$ is hydrogen or $C_1$-$C_{12}$alkyl;
X is hydrogen or halogen; and
$R_2$ and $R_3$ are each independently of the other hydrogen; $C_1$-$C_{12}$alkyl which is unsubstituted or substituted by cyano, carboxy, hydroxy, $C_1$-$C_6$alkoxy or $C_2$-$C_8$alkoxyalkoxy; or are $C_7$-$C_{25}$aralkyl which is unsubstituted or substituted by cyano, carboxy, hydroxy, $C_1$-$C_6$alkoxy or $C_2$-$C_8$alkoxyalkoxy,
to mixtures containing said dyes and to the use thereof in dyeing or printing semi-synthetic and especially synthetic hydrophobic fibre materials, more especially textile materials.

4 Claims, No Drawings

DISPERSE AZO DYES, A PROCESS FOR THE PREPARATION THEREOF AND THE USE THEREOF

CROSS-REFERENCE TO RELATED APPLICATIONS

This application is the National Phase of International Application PCT/EP2016/081232 filed Dec. 15, 2016 which designated the U.S. and which claims priority to European App. No. 16171373.0 filed May 25, 2016. The noted applications are incorporated herein by reference.

The present invention relates to disperse azo dyes based on aminophthalimides as the diazotizing component and 2,6-aminosubstituted 3-cyano-4-methylpyridines as coupling components and to the use thereof in dyeing or printing semi-synthetic and especially synthetic fibre materials, more especially textile materials.

Azo dyes based on aminophthalimides as the diazotizing component are known, for example, from U.S. Pat. No. 3,980,634 and WO 2014/016072, and azo dyes derived from 2,6-aminosubstituted 3-cyano-4-methylpyridines as coupling components are described in GB 1561772. It has, however, been found that the dyeings or prints obtained using the currently known dyes do not in all cases satisfy today's requirements, especially in respect of light fastness and fastness to washing. There is therefore a need for new dyes that especially have good light fastness properties.

Surprisingly, we found that azo dyes based on halogen- and cyanosubstituted phthalimides as diazo components and specific 2,6-aminosubstituted 3-cyano-4-methylpyridines as coupling components show good washing fastness and excellent light fastness results.

The present invention relates to dyes of formula

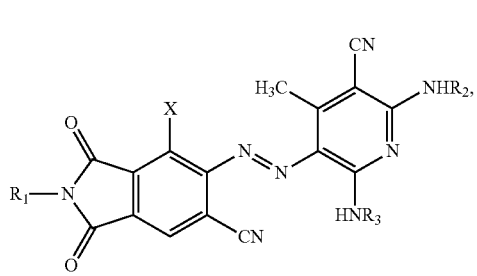

(1)

wherein
$R_1$ denotes hydrogen or $C_1$-$C_{12}$alkyl which is unsubstituted or substituted by one or more $C_1$-$C_{12}$alkoxy groups, $C_1$-$C_{12}$alkylcarbonyl groups, $C_7$-$C_{25}$arylcarbonyl groups, hydroxyl groups, amino groups, cyano groups or halogen atoms and which may be interrupted one or more times by the radical —O—, —S—, —$NR_4$—, —COO— or —OOC—, $R_4$ is hydrogen or $C_1$-$C_{12}$alkyl;
X is hydrogen or halogen; and
$R_2$ and $R_3$ are each independently of the other hydrogen; $C_1$-$C_{12}$alkyl which is unsubstituted or substituted by cyano, carboxy, hydroxy, $C_1$-$C_6$alkoxy or $C_2$-$C_8$alkoxyalkoxy; or are $C_7$-$C_{25}$aralkyl which is unsubstituted or substituted by cyano, carboxy, hydroxy, $C_1$-$C_6$alkoxy or $C_2$-$C_8$alkoxyalkoxy.

Any radical denoting alkyl may be a straight-chain or branched alkyl radical.

Examples of alkyl groups include methyl, ethyl, n-propyl, isopropyl, n-butyl, isobutyl, sec-butyl, tert-butyl, n-pentyl, isopentyl, neopentyl, n-hexyl, n-octyl, i-octyl, n-decyl and n-dodecyl.

$C_1$-$C_{12}$ alkoxy may be, for example, methoxy, ethoxy, n-propoxy, isopropoxy, n-butoxy, iso-butoxy, sec-butoxy, tert-butoxy, n-pentoxy, neopentoxy, n-hexoxy, n-octoxy, i-octoxy, n-decoxy or n-dodecoxy.

Any radical denoting halogen may be fluorine, chlorine or bromine, in particular chlorine or bromine.

Preference is given to azo dyes of formula (1), wherein $R_1$ denotes unsubstituted $C_1$-$C_{12}$alkyl.

Azo dyes of formula (1), wherein $R_1$ denotes methyl, ethyl, n-propyl, i-propyl or n-butyl, are particularly preferred In the most preferred azo dyes of formula (1) $R_1$ is ethyl.

Further preference is given to azo dyes of formula (1), wherein X is hydrogen or bromo.

Suitable radicals $R_2$ and $R_3$ are 2-methoxyethyl, 3-methoxypropyl, 4-methoxybutyl, 2-ethoxyethyl, 3-ethoxypropyl, 4-ethoxybutyl, 2-methoxyethoxyethyl, 2-ethoxyethoxyethyl, 2-methoxyethylaminoethyl, 2-ethoxyethylaminoethyl, 3-methoxypropoxyethyl, 3-ethoxypropoxyethyl, 3-methoxypropylaminoethyl and 3-ethoxypropylaminoethyl.

$R_2$ and $R_3$ preferably are each $C_3$-$C_{12}$-alkoxyalkyl, especially 2-methoxyethyl, 3-methoxypropyl, 4-methoxybutyl, 2-ethoxyethyl, 3-ethoxypropyl or 4-ethoxybutyl.

The dyes of formula (1) can be prepared according to known methods, for instance by conventional coupling reaction of the relevant diazonium salt with the respective coupling component. They can also be prepared by the process described in WO 2014/016072, i.e. by synthesis of the dye of formula

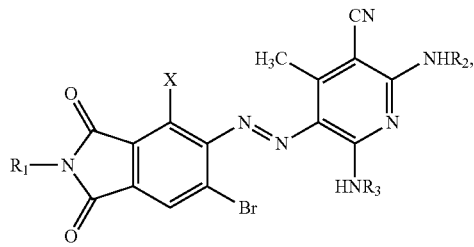

(1a)

according to the method disclosed in U.S. Pat. No. 3,980,634 and subsequent reaction with NaCN/CuCN.

The coupling components for the preparation of the dyestuffs of formula (1) are usually prepared according to U.S. Pat. No. 3,853,895 by reacting 2,6-dichloro-3-cyano-4-methylpyridine first with the compound $R_2$—$NH_2$ and then with $R_3$—$NH_2$, wherein $R_2$ and $R_3$ are as defined above. In case $R_2$ and $R_3$ are not identical, normally a mixture of two different isomers arises. From the resulting coupling component mixture, the individual coupling components can be obtained by subsequent chromatographic separation.

However, with regard to the use-oriented properties of the resulting dyestuffs it is not necessary to separate the isomeric coupling components, but they can be reacted as a mixture with the diazonium salt thus providing a mixture of dyestuffs which has no detrimental effect in comparison with the single components.

Accordingly, the isomeric coupling components resulting from the reaction of 2,6-dichloro-3-cyano-4-methylpyridine with $R_2$—$NH_2$ and $R_3$—$NH_2$, as well as the dye mixtures resulting therefrom are usually not separated.

The azo dyes according to the invention can also be used satisfactorily in the preparation of mixed shades together with other dyes.

The azo dyes according to the invention can be used especially as a suitable component in a dichromatic or trichromatic dyeing or printing technique.

The invention therefore further relates to a dichromatic or trichromatic dye mixture comprising at least one azo dye of formula (1) according to claim 1 and at least one further disperse dye.

The dyes and dye mixtures according to the invention may be used for dyeing or printing semi-synthetic and especially synthetic hydrophobic fibre materials, more especially textile materials. Textile materials composed of blend fabrics that comprise such semi-synthetic or synthetic hydrophobic fibre materials can also be dyed or printed using the dyes according to the invention.

Semi-synthetic fibre materials that come into consideration are, especially, cellulose 2½-acetate and cellulose triacetate.

Synthetic hydrophobic fibre materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride or on polyamide.

The application of the dyes and dye mixtures according to the invention to the fibre materials is effected in accordance with known dyeing methods. For example, polyester fibre materials are dyed in the exhaust process from an aqueous dispersion in the presence of customary anionic or non-ionic dispersants and, optionally, customary swelling agents (carriers) at temperatures of from 80 to 140° C. Cellulose 2½-acetate is dyed preferably at from 65 to 85° C. and cellulose triacetate at temperatures of from 65 to 115° C.

The dyes according to the invention are characterised by very high light fastness and fastness to washing.

The dyes and dye mixtures according to the invention will not colour wool and cotton present at the same time in the dyebath or will colour such materials only slightly (very good reservation) so that they can also be used satisfactorily in the standard dyeing procedure of polyester/wool and polyester/cellulosic fibre blend fabrics.

The dyes and dye mixtures according to the invention can advantageously be applied in the process described in WO 2005/024123.

The dyes and dye mixtures according to the invention are suitable for dyeing in accordance with the thermosol process, in the exhaust process and for printing processes.

In such processes, the said fibre materials can be in a variety of processing forms, e.g. in the form of fibres, yarns or nonwoven, woven or knitted fabrics.

It is advantageous to convert the dyes and dye mixtures according to the invention into a dye preparation prior to use. For this purpose, the dye is ground so that its particle size is on average from 0.1 to 10 microns. Grinding can be carried out in the presence of dispersants.

For example, the dried dye is ground together with a dispersant or kneaded into a paste form together with a dispersant and then dried in vacuo or by atomisation. After adding water, the resulting preparations can be used to prepare printing pastes and dyebaths.

For printing, the customary thickeners will be used, e.g. modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The dyes of formula (1) according to the invention are also suitable as colorants for use in recording systems. Such recording systems are, for example, commercially available ink-jet printers for paper or textile printing, or writing instruments, such as fountain pens or ballpoint pens, and especially ink-jet printers. For that purpose, the dyes according to the invention are first brought into a form suitable for use in recording systems. A suitable form is, for example, an aqueous ink, which comprises the dyes according to the invention as colorants. The inks can be prepared in customary manner by grinding the dye to the appropriate particle size in the nanometer range and mixing together the individual components, if necessary in combination with suitable dispersing agents, in the desired amount of water and, optionally, co-solvents.

The dyes according to the invention impart to the said materials, especially to polyester materials, level colour shades having good in-use fastness properties such as fastness to light, fastness to heat setting, fastness to pleating, fastness to chlorine and wet fastness, e.g. fastness to water, to perspiration and to washing; the finished dyeings are further characterised by good fastness to rubbing. Special emphasis should be given to the good fastness to washing and excellent light fastness of the dyeings.

Furthermore, the dyes and dye mixtures according to the invention are also well suited to dyeing hydrophobic fibre materials from supercritical $CO_2$.

The present invention further relates to the above-mentioned use of the dyes according to the invention as well as to a process for the dyeing or printing of semi-synthetic or synthetic hydrophobic fibre materials, especially textile materials, in which process a dye or a dye mixture according to the invention is applied to the said materials or incorporated into them. The said hydrophobic fibre materials are preferably textile polyester materials. Further substrates that can be treated by the process according to the invention and preferred process conditions can be found hereinbefore in the more detailed description of the use of the dyes according to the invention.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The present invention accordingly relates also to aqueous inks that comprise the dyes of formula (1) according to the invention and to the use of such inks in an ink-jet printing method for printing a variety of substrates, especially textile fibre materials, the definitions and preferences indicated above applying to the dyes, the inks and the substrates.

The invention relates also to hydrophobic fibre materials, preferably polyester textile materials, dyed or printed by the said process.

The dyes according to the invention are, in addition, suitable for modern reproduction processes, e.g. thermotransfer printing.

The Examples that follow serve to illustrate the invention. Parts therein are parts by weight and percentages are percentages by weight, unless otherwise indicated. Temperatures are given in degrees Celsius. The relationship between parts by weight and parts by volume is the same as between grams and cubic centimetres.

I. PREPARATION EXAMPLES

I.1 Dyestuff of Formula (101)

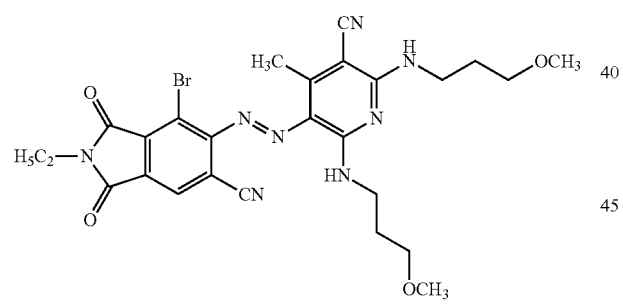

(101)

5.0 g of the dye of formula (101a)

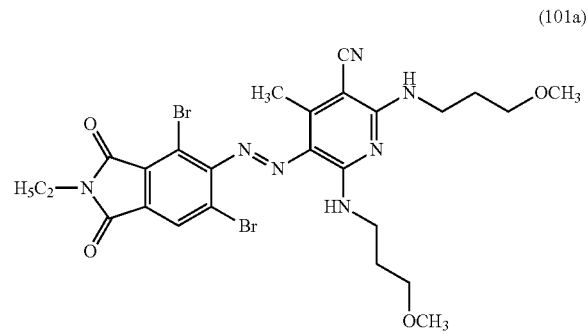

(101a)

which was prepared as described in U.S. Pat. No. 3,980,634 are dissolved under stirring at RT (room temperature) in 60 ml of pyridine. 0.073 g finely powdered NaCN and 0.27 g finely powdered CuCN are given to 50 ml pyridine and suspended under vigorous stirring. The reaction mixture is stirred over night and then diluted with 80 ml pyridine. The precipitate is filtered off and washed with water.

According to HPLC analysis, the crude product essentially consists of a mixture of three different dyestuffs namely the educt of formula (101a), the dyestuff of formula (101) and the dicyano compound of formula (101 b) which are separated by conventional chromatographic methods.

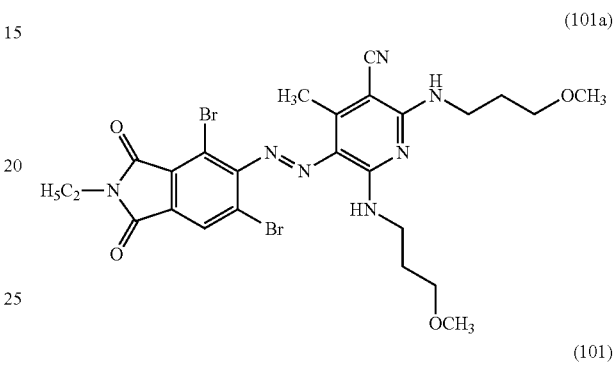

(101a)

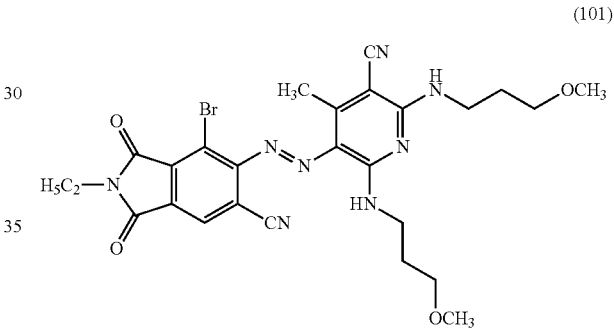

(101)

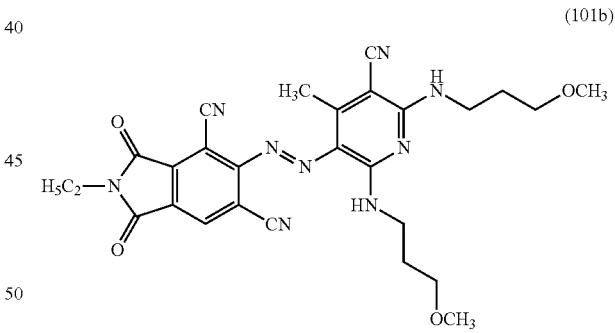

(101b)

The dyestuff of formula (101) is characterized by the following properties:

m.p. (melting point)=217-226° C.

$\lambda_{max}$=527 nm ($\lambda_{max}$=wavelength of the absorption maximum, measured in DMF)

| Elemental Analysis: | in theorie | found |
|---|---|---|
| C | 52.3% | 52.4% |
| H | 4.9% | 4.9% |
| N | 18.8% | 18.6% |

$^1$H-NMR (CDCl$_3$, 250 MHz): δ=11.49 (1H, —NH), 8.08 (s, 1H), 7.05 (1H, —NH), 3.69-3.82 (m, 6H), 3.61 (t, J=6.1,

2H), 3.45-3.50 (m, 2H), 3.44 (s, 3H), 3.33 (s, 3H), 2.83 (s, 3H), 1.91-2.00 (m, 4H), 1.31 (t, J=7.2, 3H)

I.2 Dyestuff of Formula (102)

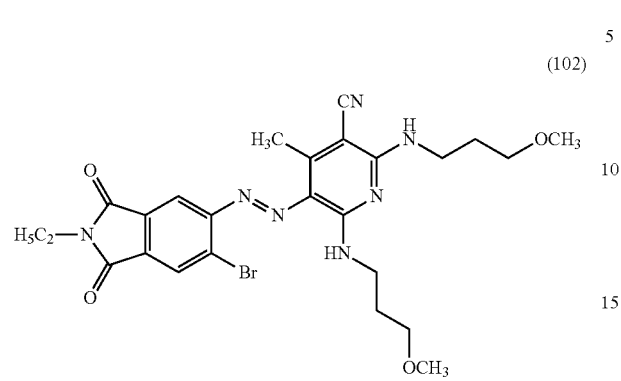

(102)

The dye of formula (102) is prepared either by conventional coupling reaction of the relevant diazonium salt with the respective coupling component or according to the method described in Example 1.1 from the respective monobromo compound.

m.p. (melting point)=231-237° C.

$\lambda_{max}$=527 nm ($\lambda_{max}$=wavelength of the absorption maximum, measured in DMF)

| Elemental Analysis: | in theorie | found |
|---|---|---|
| C | 60.22% | 59.90% |
| H | 5.83% | 6.0% |
| N | 21.61% | 21.20% |

$^1$H-NMR (CDCl$_3$, 250 MHz): δ=11.35 (1H, —NH), 8.22 (s, 1H), 8.105 (s, 1H), 6.96 (1H, —NH), 3.69-3.83 (m, 6H), 3.61 (t, J=5.45, 2H), 3.45-3.50 (m, 2H), 3.44 (s, 3H), 3.32 (s, 3H), 2.74 (s, 3H), 1.93-2.04 (m, 4H), 1.30 (t, J=7.2, 3H) The dyes of formulae (103)-(207) listed in the following Table 1 can be prepared in analogy to the method described above.

TABLE 1

Dyestuffs of formula (1)

(1)

| Dye | R$_1$ | X | R$_2$ | R$_3$ |
|---|---|---|---|---|
| 103 | ethyl | Cl | 3-methoxypropyl | 3-methoxypropyl |
| 104 | ethyl | H | 2-methoxyethyl | 2-methoxyethyl |
| 105 | ethyl | Br | 2-methoxyethyl | 2-methoxyethyl |
| 106 | ethyl | Cl | 2-methoxyethyl | 2-methoxyethyl |
| 107 | ethyl | H | 4-methoxybutyl | 4-methoxybutyl |
| 108 | ethyl | Br | 4-methoxybutyl | 4-methoxybutyl |
| 109 | ethyl | Cl | 4-methoxybutyl | 4-methoxybutyl |
| 110 | ethyl | H | 2-ethoxyethyl | 2-ethoxyethyl |
| 111 | ethyl | Br | 2-ethoxyethyl | 2-ethoxyethyl |
| 112 | ethyl | Cl | 2-ethoxyethyl | 2-ethoxyethyl |
| 113 | ethyl | H | 3-ethoxypropyl | 3-ethoxypropyl |
| 114 | ethyl | Br | 3-ethoxypropyl | 3-ethoxypropyl |
| 115 | ethyl | Cl | 3-ethoxypropyl | 3-ethoxypropyl |
| 116 | methyl | H | 3-methoxypropyl | 3-methoxypropyl |
| 117 | methyl | Br | 3-methoxypropyl | 3-methoxypropyl |
| 118 | methyl | Cl | 3-methoxypropyl | 3-methoxypropyl |
| 119 | methyl | H | 2-methoxyethyl | 2-methoxyethyl |
| 120 | methyl | Br | 2-methoxyethyl | 2-methoxyethyl |
| 121 | methyl | Cl | 2-methoxyethyl | 2-methoxyethyl |
| 122 | methyl | H | 4-methoxybutyl | 4-methoxybutyl |
| 123 | methyl | Br | 4-methoxybutyl | 4-methoxybutyl |
| 124 | methyl | Cl | 4-methoxybutyl | 4-methoxybutyl |
| 125 | methyl | H | 2-ethoxyethyl | 2-ethoxyethyl |
| 126 | methyl | Br | 2-ethoxyethyl | 2-ethoxyethyl |
| 127 | methyl | Cl | 2-ethoxyethyl | 2-ethoxyethyl |
| 128 | methyl | H | 3-ethoxypropyl | 3-ethoxypropyl |
| 129 | methyl | Br | 3-ethoxypropyl | 3-ethoxypropyl |
| 130 | methyl | Cl | 3-ethoxypropyl | 3-ethoxypropyl |
| 131 | n-propyl | H | 3-methoxypropyl | 3-methoxypropyl |
| 132 | n-propyl | Br | 3-methoxypropyl | 3-methoxypropyl |
| 133 | n-propyl | Cl | 3-methoxypropyl | 3-methoxypropyl |
| 134 | n-propyl | H | 2-methoxyethyl | 2-methoxyethyl |
| 135 | n-propyl | Br | 2-methoxyethyl | 2-methoxyethyl |
| 136 | n-propyl | Cl | 2-methoxyethyl | 2-methoxyethyl |
| 137 | n-propyl | H | 4-methoxybutyl | 4-methoxybutyl |
| 138 | n-propyl | Br | 4-methoxybutyl | 4-methoxybutyl |
| 139 | n-propyl | Cl | 4-methoxybutyl | 4-methoxybutyl |
| 140 | n-propyl | H | 2-ethoxyethyl | 2-ethoxyethyl |
| 141 | n-propyl | Br | 2-ethoxyethyl | 2-ethoxyethyl |
| 142 | n-propyl | Cl | 2-ethoxyethyl | 2-ethoxyethyl |
| 143 | n-propyl | H | 3-ethoxypropyl | 3-ethoxypropyl |
| 144 | n-propyl | Br | 3-ethoxypropyl | 3-ethoxypropyl |
| 145 | n-propyl | Cl | 3-ethoxypropyl | 3-ethoxypropyl |
| 146 | n-butyl | H | 3-methoxypropyl | 3-methoxypropyl |
| 147 | n-butyl | Br | 3-methoxypropyl | 3-methoxypropyl |
| 148 | n-butyl | Cl | 3-methoxypropyl | 3-methoxypropyl |
| 149 | n-butyl | H | 2-methoxyethyl | 2-methoxyethyl |
| 150 | n-butyl | Br | 2-methoxyethyl | 2-methoxyethyl |
| 151 | n-butyl | Cl | 2-methoxyethyl | 2-methoxyethyl |
| 152 | n-butyl | H | 4-methoxybutyl | 4-methoxybutyl |
| 153 | n-butyl | Br | 4-methoxybutyl | 4-methoxybutyl |
| 154 | n-butyl | Cl | 4-methoxybutyl | 4-methoxybutyl |
| 155 | n-butyl | H | 2-ethoxyethyl | 2-ethoxyethyl |
| 156 | n-butyl | Br | 2-ethoxyethyl | 2-ethoxyethyl |
| 157 | n-butyl | Cl | 2-ethoxyethyl | 2-ethoxyethyl |
| 158 | n-butyl | H | 3-ethoxypropyl | 3-ethoxypropyl |
| 159 | n-butyl | Br | 3-ethoxypropyl | 3-ethoxypropyl |
| 160 | n-butyl | Cl | 3-ethoxypropyl | 3-ethoxypropyl |
| 161 | H | H | 3-methoxypropyl | 3-methoxypropyl |
| 162 | H | Br | 3-methoxypropyl | 3-methoxypropyl |
| 163 | H | Cl | 3-methoxypropyl | 3-methoxypropyl |
| 164 | H | H | 2-methoxyethyl | 2-methoxyethyl |
| 165 | H | Br | 2-methoxyethyl | 2-methoxyethyl |
| 166 | H | Cl | 2-methoxyethyl | 2-methoxyethyl |
| 167 | H | H | 4-methoxybutyl | 4-methoxybutyl |
| 168 | H | Br | 4-methoxybutyl | 4-methoxybutyl |
| 169 | H | Cl | 4-methoxybutyl | 4-methoxybutyl |
| 170 | H | H | 2-ethoxyethyl | 2-ethoxyethyl |
| 171 | H | Br | 2-ethoxyethyl | 2-ethoxyethyl |
| 172 | H | Cl | 2-ethoxyethyl | 2-ethoxyethyl |
| 173 | H | H | 3-ethoxypropyl | 3-ethoxypropyl |
| 174 | H | Br | 3-ethoxypropyl | 3-ethoxypropyl |
| 175 | H | Cl | 3-ethoxypropyl | 3-ethoxypropyl |

TABLE 1-continued

Dyestuffs of formula (1)

(1)

| Dye | R₁ | X | R₂ | R₃ |
|---|---|---|---|---|
| 176 | ethyl | Cl | 3-methoxypropyl | 2-methoxyethyl |
| 177 | ethyl | H | 2-methoxyethyl | 3-methoxypropyl |
| 178 | ethyl | Br | 3-methoxypropyl | 2-methoxyethyl |
| 179 | ethyl | Cl | 2-methoxyethyl | 3-methoxypropyl |
| 180 | ethyl | H | 4-methoxybutyl | 2-methoxyethyl |
| 181 | ethyl | Br | 4-methoxybutyl | 2-methoxyethyl |
| 182 | ethyl | Cl | 4-methoxybutyl | 2-methoxyethyl |
| 183 | ethyl | H | 2-ethoxyethyl | 2-methoxyethyl |
| 184 | ethyl | Br | 2-ethoxyethyl | 2-methoxyethyl |
| 185 | ethyl | Cl | 2-ethoxyethyl | 2-methoxyethyl |
| 186 | ethyl | H | 3-ethoxypropyl | 2-methoxyethyl |
| 187 | ethyl | Br | 3-ethoxypropyl | 2-methoxyethyl |
| 188 | ethyl | Cl | 3-ethoxypropyl | 2-methoxyethyl |
| 189 | ethyl | Cl | H | 3-methoxypropyl |
| 190 | ethyl | H | H | 2-methoxyethyl |
| 191 | ethyl | Br | 2-methoxyethyl | H |
| 192 | ethyl | Cl | 2-methoxyethyl | H |
| 193 | ethyl | H | H | 4-methoxybutyl |
| 194 | ethyl | Br | 4-methoxybutyl | H |
| 195 | ethyl | Cl | 4-methoxybutyl | H |
| 196 | ethyl | H | H | 2-ethoxyethyl |
| 197 | ethyl | Br | H | H |
| 198 | ethyl | Cl | 2-ethoxyethyl | H |
| 199 | ethyl | H | H | 3-ethoxypropyl |
| 200 | ethyl | Br | 3-ethoxypropyl | H |
| 201 | ethyl | Cl | H | 3-ethoxypropyl |
| 202 | ethyl | Br | n-butyl | n-butyl |
| 203 | ethyl | H | n-butyl | n-butyl |
| 204 | ethyl | Br | n-pentyl | n-pentyl |
| 205 | ethyl | H | n-pentyl | n-pentyl |
| 206 | ethyl | Br | benzyl | Benzyl |
| 207 | ethyl | H | benzyl | benzyl |

II. APPLICATION EXAMPLES

II.1: Dyeing of Polyester 15 parts by weight of the dye of formula (101) prepared in Example 1.1 is milled together with 4.4 parts of a commercially available dispersing agent in a total of 100 parts of aqueous dispersion. Using that formulation, a 1% dyeing (based on the dye and the substrate) is produced on woven polyester by high temperature exhaust process at 135° C.

Test results: the light fastness of the dyeing is excellent as well as the results in the AATCC 61 and ISO 105 tests. The build-up and wash fastness properties of the dye are very good.

II.2: Dyeing of Polyester

Example II.1 is repeated by using the dye of formula (102) instead of the dye of formula (101). Test results: the light fastness of the dyeing is excellent as well as the results in the AATCC 61 and ISO 105 tests.

What is claimed is:

1. An azo dye of formula

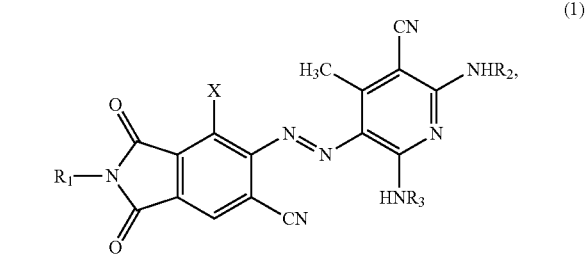

(1)

wherein $R_1$ denotes $C_2$ alkyl;

X is hydrogen or bromine; and $R_2$ and $R_3$ are each $C_3$ alkyl substituted by $C_1$ alkoxy.

2. A dichromatic or trichromatic dye mixture comprising at least one azo dye of formula (1) according to claim 1 and at least one further disperse dye.

3. A process for dyeing polyester fibre materials, in which process a dye of formula (1) according to claim 1 is applied at a concentration of 1.0% by weight to the said polyester materials.

4. A polyester fibre material dyed by the process according to claim 3.

* * * * *